United States Patent

Fujinaka

(10) Patent No.: US 11,340,515 B2
(45) Date of Patent: May 24, 2022

(54) LINEAR MOTOR, AND LENS BARREL AND IMAGING DEVICE EQUIPPED WITH SAME

(71) Applicant: Panasonic Intellectual Property Management Co., Ltd., Osaka (JP)

(72) Inventor: Hiroyasu Fujinaka, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 476 days.

(21) Appl. No.: 16/605,194

(22) PCT Filed: Feb. 18, 2019

(86) PCT No.: PCT/JP2019/005782
§ 371 (c)(1),
(2) Date: Oct. 14, 2019

(87) PCT Pub. No.: WO2019/234980
PCT Pub. Date: Dec. 12, 2019

(65) Prior Publication Data
US 2021/0356841 A1 Nov. 18, 2021

(30) Foreign Application Priority Data
Jun. 8, 2018 (JP) .............................. JP2018-110611

(51) Int. Cl.
*G03B 3/10* (2021.01)
*H02K 41/035* (2006.01)
(Continued)

(52) U.S. Cl.
CPC ................. *G03B 3/10* (2013.01); *G02B 7/08* (2013.01); *G03B 13/32* (2013.01); *H02K 41/0356* (2013.01); *G03B 17/12* (2013.01)

(58) Field of Classification Search
CPC .......... G03B 3/10; G03B 13/32; G03B 17/12; G02B 7/08; G02B 7/09; H02K 41/0356
See application file for complete search history.

(56) References Cited

U.S. PATENT DOCUMENTS 5,708,535 A   1/1998  Orimo
5,955,798 A   9/1999  Ishiyama
(Continued)

FOREIGN PATENT DOCUMENTS

EP    0905869 A2    3/1999
JP    H3-207257     9/1991
(Continued)

OTHER PUBLICATIONS

Machine translation of JPH07143729 retrieved from Espacenet, Nov. 12, 2021 (Year: 2021).*
(Continued)

*Primary Examiner* — Cara E Rakowski
(74) *Attorney, Agent, or Firm* — Renner, Otto, Boisselle & Sklar, LLP

(57) ABSTRACT

A focusing unit (1) comprises a linear motor driven in two phases, and comprises a two-phase coil (10a, 10b) and a drive magnet (9) that is disposed along the drive direction at a position opposite the two-phase coil (10a, 10b). The winding width of the coils (10a, 10b) in the portion opposite the drive magnet (9) is within an electrical angle range of 120°±7.7°, the average width of the coil at the portion opposite the drive magnet (9) is within an electrical angle range of 144°±4.6°, and the pitch between the two phases of coil (10a, 10b) is an electrical angle of 90°+180°×n (n is an integer of 0 or more).

7 Claims, 19 Drawing Sheets

(51) Int. Cl.
*G02B 7/08* (2021.01)
*G03B 13/32* (2021.01)
*G03B 17/12* (2021.01)

(56) References Cited

U.S. PATENT DOCUMENTS

| | | |
|---|---|---|
| 6,661,128 B2 | 12/2003 | Mori |
| 7,291,945 B2 | 11/2007 | Nashiki |
| 7,816,822 B2 | 10/2010 | Nashiki |
| 8,120,215 B2 | 2/2012 | Nashiki |
| 2003/0151314 A1 | 8/2003 | Mori |
| 2006/0006744 A1 | 1/2006 | Nashiki |
| 2006/0279166 A1 | 12/2006 | Takeuchi |
| 2009/0021089 A1 | 1/2009 | Nashiki |
| 2009/0236930 A1 | 9/2009 | Nashiki |
| 2018/0128649 A1 | 5/2018 | Terajima |

FOREIGN PATENT DOCUMENTS

| | | |
|---|---|---|
| JP | H4-33565 | 2/1992 |
| JP | H6-153428 | 5/1994 |
| JP | H7-143729 | 6/1995 |
| JP | H8-182290 | 7/1996 |
| JP | H8-248290 | 9/1996 |
| JP | H8-275500 | 10/1996 |
| JP | H8-331833 | 12/1996 |
| JP | H9-247921 | 9/1997 |
| JP | H10-23730 | 1/1998 |
| JP | H11-122903 | 4/1999 |
| JP | 2001-197718 | 7/2001 |
| JP | 2002-95231 | 3/2002 |
| JP | 2003-164137 | 6/2003 |
| JP | 2004-56892 | 2/2004 |
| JP | 2004-357353 | 12/2004 |
| JP | 2006-25559 | 1/2006 |
| JP | 2013-222116 | 10/2013 |
| JP | 2014-202898 | 10/2014 |
| JP | 2017-209012 | 11/2017 |
| WO | 2006/118219 | 11/2006 |
| WO | 2006/123659 | 11/2006 |

OTHER PUBLICATIONS

Machine translation of JP 2014202898 retrieved from Espacenet Nov. 12, 2021 (Year: 2021).*

Extended European Search Report for corresponding Application No. 21193732.1, dated Jan. 18, 2022.

Extended European Search Report for corresponding Application No. 19789851.3, dated Oct. 7, 2021.

International Search Report No. PCT/JP2019/005782 dated Apr. 2, 2019.

* cited by examiner

|  | Comparative Example FIG. 10A | Embodiment FIG. 4 | Other Embodiment FIG. 10B |
|---|---|---|---|
| Fundamental wave component | 0.407<br>100% | 0.434<br>106.46% | 0.335<br>82.34% |
| Third harmonic component | −0.013<br>−3.18% | 0.000<br>0.00% | 0.000<br>0.00% |
| Fifth harmonic component | −0.0013<br>−0.32% | 0.0000<br>0.00% | 0.0000<br>0.00% |
| Seventh harmonic component | 0.0002<br>0.05% | 0.0001<br>0.03% | −0.0002<br>−0.06% |
| Ninth harmonic component | 0.0000<br>0.01% | 0.0000<br>0.00% | 0.000<br>0.00% |

FIG. 11

LINEAR MOTOR, AND LENS BARREL AND IMAGING DEVICE EQUIPPED WITH SAME

TECHNICAL FIELD

The present disclosure relates to a linear motor, and to a lens barrel and an imaging device equipped with the same.

BACKGROUND ART

Conventionally, a linear motor capable of high-speed response has been used in order to move the lens frame of a lens barrel in the optical axis direction (for example, Patent Literature 1).

CITATION LIST

Patent Literature

Patent Literature 1: JP-A H8-248290

SUMMARY

Technical Problem

It is an object of the present disclosure to provide a linear motor with which thrust can be increased and stroke lengthened, as well as a lens barrel and an imaging device equipped with this linear motor.

Solution to Problem

The linear motor disclosed herein is a linear motor driven in two phases, and comprises a two-phase coil and a magnet that is disposed along the drive direction at a position opposite the two-phase coil. The winding width of the coil at the portion opposite the magnet is within an electrical angle range of $120°±7.7°$, the average width of the coil at the portion opposite the magnet is within an electrical angle range of $144°±4.6°$, and the pitch between the two-phase coil is an electrical angle of $90°+180°×n$ (n is an integer of 0 or more).

Advantageous Effects

With the linear motor disclosed herein, the thrust density of the linear motor can be increased. Furthermore, solving the problem of magnetic saturation affords a configuration that facilitates a longer stroke.

BRIEF DESCRIPTION OF DRAWINGS

FIG. 11 is a table comparing the comparative example shown in FIG. 10A with the configuration of the embodiment shown in FIG. 4 and the configuration the other embodiment shown in FIG. 10B;

DESCRIPTION OF EMBODIMENTS

Figure 1:
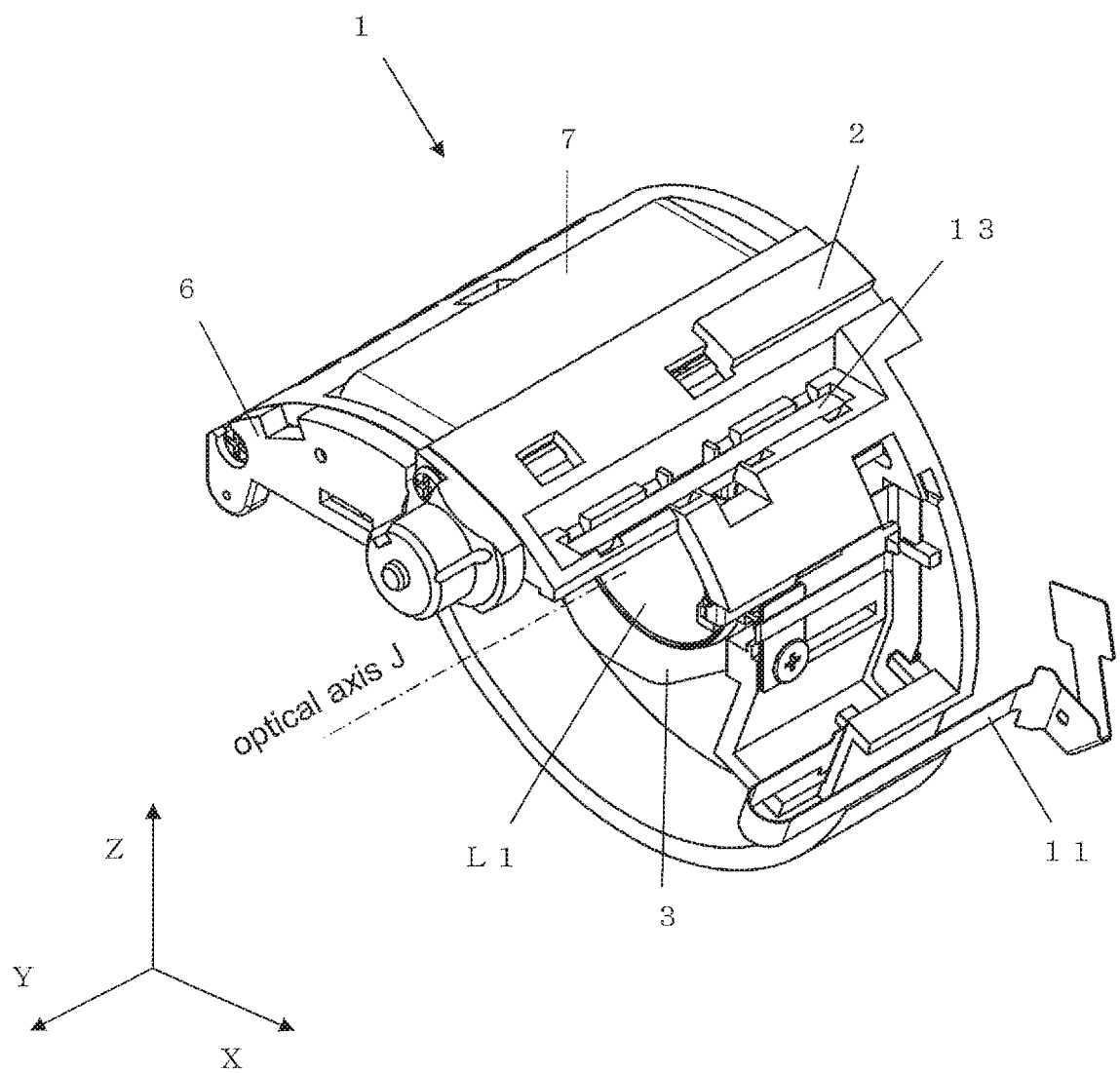
FIG. 1 is an oblique view of a focusing unit according to Embodiment 1.

Findings Forming the Basis of the Disclosure, Etc.

Nevertheless, the following problems are encountered with the conventional linear motor described above.

In recent years, the size of imaging elements used in imaging devices has been increasing due to larger numbers of pixels, improvements to the dynamic range, and so on.

As an imaging element becomes larger, the lens used in the lens barrel also necessarily becomes larger, and the amount of lens movement also increases.

In order to drive a larger lens, the actuator that drives the lens needs to have greater thrust and a longer stroke than a conventional actuator.

The technology described in Patent Literature 1 discloses a configuration in which thrust is increased by providing a plurality of field magnet components to a single coil.

However, with the technology described in Patent Literature 1 above, there is a limit to how much the thrust can be increased. In addition, when the stroke is increased, magnetic saturation of the yoke cannot be ignored, so a problem is that it is difficult to increase the stroke.

Embodiments pertaining to this disclosure will now be described through reference to the drawings as needed. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The inventors have provided the appended drawings and the following description so that a person skilled in the art might fully understand this disclosure, but do not intend for these to limit what is discussed in the patent claims.

In addition, some terms will be modified by "substantially." To use "substantially the same" as an example, this is intended to encompass not only something that is identical, but also things that are recognized as being essentially the same. The same applies to phrases such as "near . . . " and "approximately . . . "

The drawings are not necessarily strictly drawn to scale. Also, in the drawings, configurations that are substantially the same will be numbered the same, and redundant descriptions will be omitted or simplified.

Embodiment 1

The configuration of the focusing unit (linear motor) 1 according to Embodiment 1 will now be described with reference to FIGS. 1 to 11 and 17 to 20.

The focusing unit 1 comprises a lens that mainly performs focusing in an interchangeable lens barrel 40 (see FIG. 19), and a linear motor that drives the lens.

Figure 2:
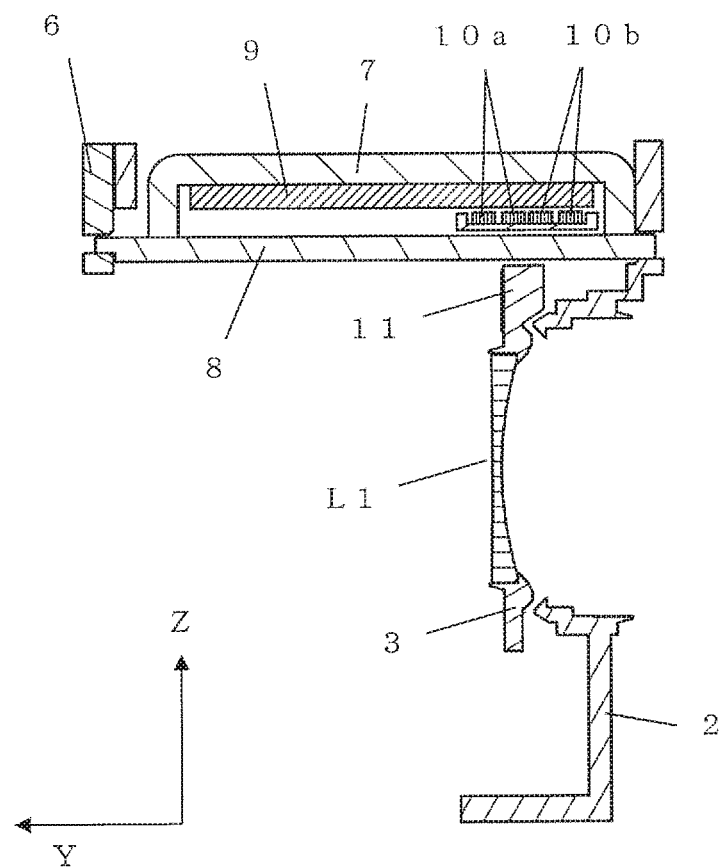
FIG. 2 is a cross section of the focusing unit according to Embodiment 1.
Figure 3:
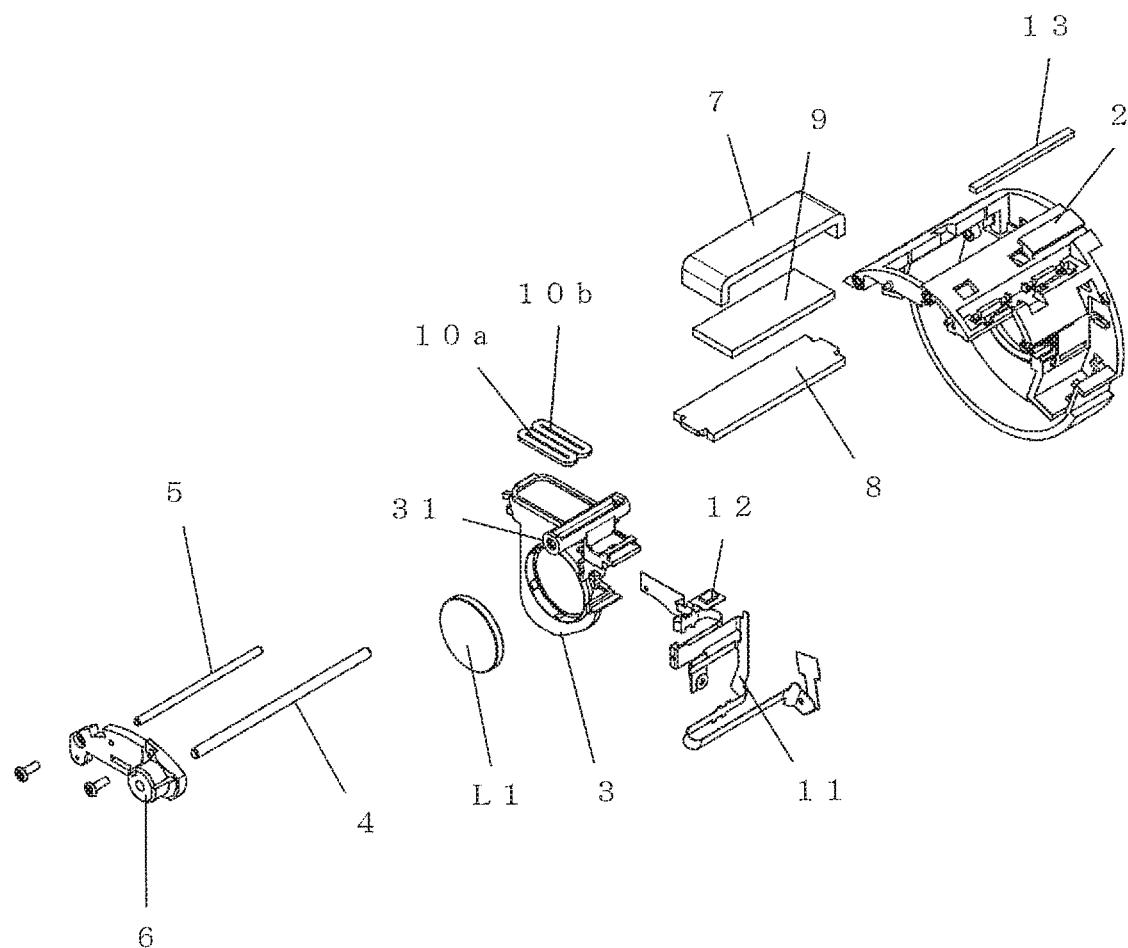
FIG. 3 is an exploded oblique view of the focusing unit according to Embodiment 1.
Figure 4:
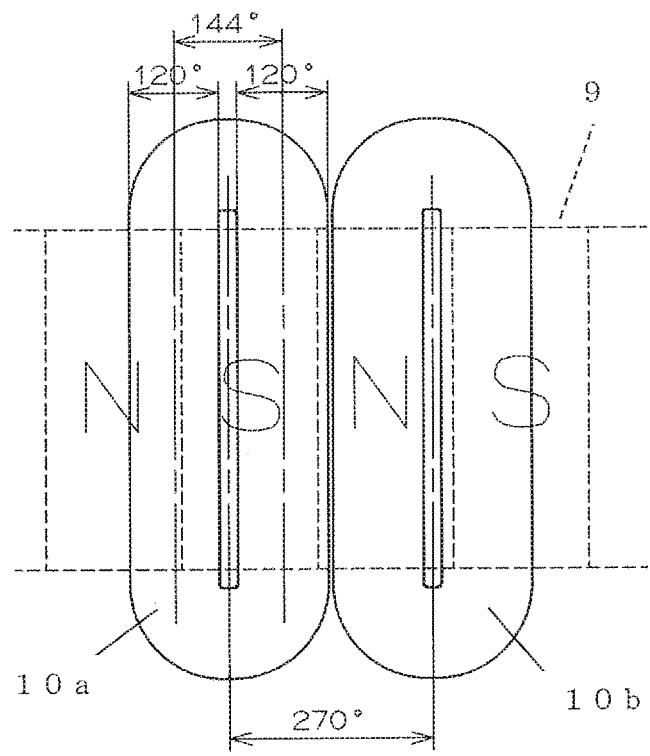
FIG. 4 is a diagram illustrating the relation between the coil and the magnet in Embodiment 1.

FIG. 1 is an oblique view of the focusing unit 1 in Embodiment 1. FIG. 2 is a cross section of the focusing unit 1 in Embodiment 1. FIG. 3 is an exploded oblique view of the focusing unit 1 in Embodiment 1. FIG. 4 is a diagram illustrating the relation between the coil and the magnet in Embodiment 1.

In FIG. 1, the Y axis direction is defined as a direction parallel to the optical axis J of a camera (imaging device) 50 (see FIG. 20) equipped with a lens barrel 40 and a camera body (main body unit) 51 on which the lens barrel 40 is mounted. The horizontal direction is defined as the X axis direction, and the vertical upper side is defined as the Z axis direction. Also, the subject side is defined as the Y axis positive direction side, and the imaging device side is defined as the Y axis negative direction side. In FIG. 1, the Y axis direction and the Z axis direction are not limited to these definitions because they change depending on the usage mode. The same applies to the drawings that come after FIG. 1.

As shown in FIGS. 1 to 3, the focusing unit 1 has a holding frame 2, a focus lens L1, a lens frame 3, a main guide pole 4, a auxiliary guide pole 5, and a guide cover 6.

The holding frame 2 is made of plastic and is open on the Y axis plus direction side.

As shown in FIGS. 2 and 3, a field magnet component having a main yoke 7, an auxiliary yoke 8, and a drive magnet 9 is fixed to the holding frame 2, and an accommodation space is formed in which the lens frame 3 is accommodated movably in the optical axis direction.

The main yoke 7 is substantially U shaped in cross section, and is disposed along the outer peripheral face of the holding frame 2.

The auxiliary yoke 8 is in the form of a flat plate, and is in contact with the end face of the main yoke 7.

The drive magnet 9 is provided along the inner peripheral face of the main yoke 7. The drive magnet 9 is multipolar-magnetized so that the inner peripheral side alternately has north and south poles along the optical axis direction.

Coils 10a and 10b are fixed to the lens frame 3. Power from a power supply unit is supplied to the coils 10a and 10b. The supply of power is performed via a flexible substrate 11.

When current is applied to the coils 10a and 10b according to the position of the lens frame 3, the coils 10a and 10b are subjected to a Lorentz force and exert a force in the Y axis direction. As a result, the lens frame 3 can be moved along the Y axis direction.

Here, just as with the technology described in Patent Literature 1, when the magnet is constituted by a single pole magnetized magnet, if the stroke is lengthened in the optical axis direction, the magnetic flux density of the yoke increases in proportion to the length of the magnet and the yoke becomes magnetically saturated, so thrust often ends up being reduced.

On the other hand, with the configuration in this embodiment, increasing the number of magnetic poles by making the drive magnet 9 longer in the optical axis direction allows just the stroke to be extended, while leaving the thrust unchanged.

As shown in FIGS. 2 and 3, the lens frame 3 is able to move along the Y axis direction. The lens frame 3 has the focus lens L1 and an MR (magneto resistive) element 12 (an example of a position detection sensor). The holding frame 2 also has an MR magnet 13 (an example of a position detection member). The lens frame 3 is formed in a substantially cylindrical shape, and holds the focus lens L1 in its interior. The lens frame 3 has formed in it a pole insertion hole 31, through which the main guide pole 4 is inserted. Also, the auxiliary guide pole 5 is fixed to the holding frame 2 so that the lens frame 3 moves linearly in the Y axis direction.

In this embodiment, although the MR element 12 is used as an example of the position detection sensor, a photo coupler may be used as an example of the position detection sensor instead of the MR element 12.

Further, in this embodiment the MR magnet 13 is used as an example of the position detection member, but the position detection member may instead be a reflection mirror, for example.

As shown in FIG. 3, the MR magnet 13 is provided to the holding frame 2 near the MR element 12. The movement of the lens frame 3 provided with the MR element 12 causes the MR element 12 to detect a change in the magnetic field produced in the MR magnet 13.

The MR element 12 is provided to the lens frame 3. For example, when the lens frame 3 is moved during imaging, the position of the MR magnet 13 relative to the MR element 12 changes. At this point, the magnetic flux changes at the position of the MR element 12, and the output of the MR element 12 also changes. This means that if the output of the MR element 12 is sensed, the shift position of the lens frame 3 can also be sensed.

As shown in FIG. 3, the main guide pole 4 and the auxiliary guide pole 5 are cylindrical metal members and extend substantially parallel to the Y axis direction. The main guide pole 4 supports the lens frame 3 movably in the Y axis direction. In other words, the main guide pole 4 guides the lens frame 3 so as to move along the optical axis J. One end side (the Y axis negative direction side) of the main guide pole 4 is held by the holding frame 2, and the other end side (the Y axis positive direction side) of the main guide pole 4 is held by the guide cover 6.

The guide cover 6 is a plastic cover member, and is provided to the end on the Y axis positive direction side. More specifically, the guide cover 6 is fixed (held) to an end of the holding frame 2 on the Y axis positive direction side (subject side) by a screw.

FIG. 4 is a diagram illustrating the relation between the coils 10a and 10b and the drive magnet 9 in Embodiment 1.

In FIG. 4, all the angular dimensions indicate the electrical angle.

In FIG. 4, the coil 10a and the coil 10b have exactly the same configuration. The coil 10a and the coil 10b are fixed at positions that are offset by an electrical angle of 270° in the Y direction.

The coil 10a and the coil 10b are driven by supplying a sinusoidal current according to the position of the magnet 9 (indicated by a broken line in the drawing).

Since the coil 10a and the coil 10b are out of phase by 270° (−90°), they can be driven by applying a two-phase current whose phase is 90° out of phase.

The shapes of the coils 10a and 10b are designed such that the winding width of the coils is an electrical angle of 120° and the average width of the coils is an electrical angle of 144°.

The reason for giving the coils 10a and 10b such a shape will now be described with reference to FIG. 5.

Figure 5:
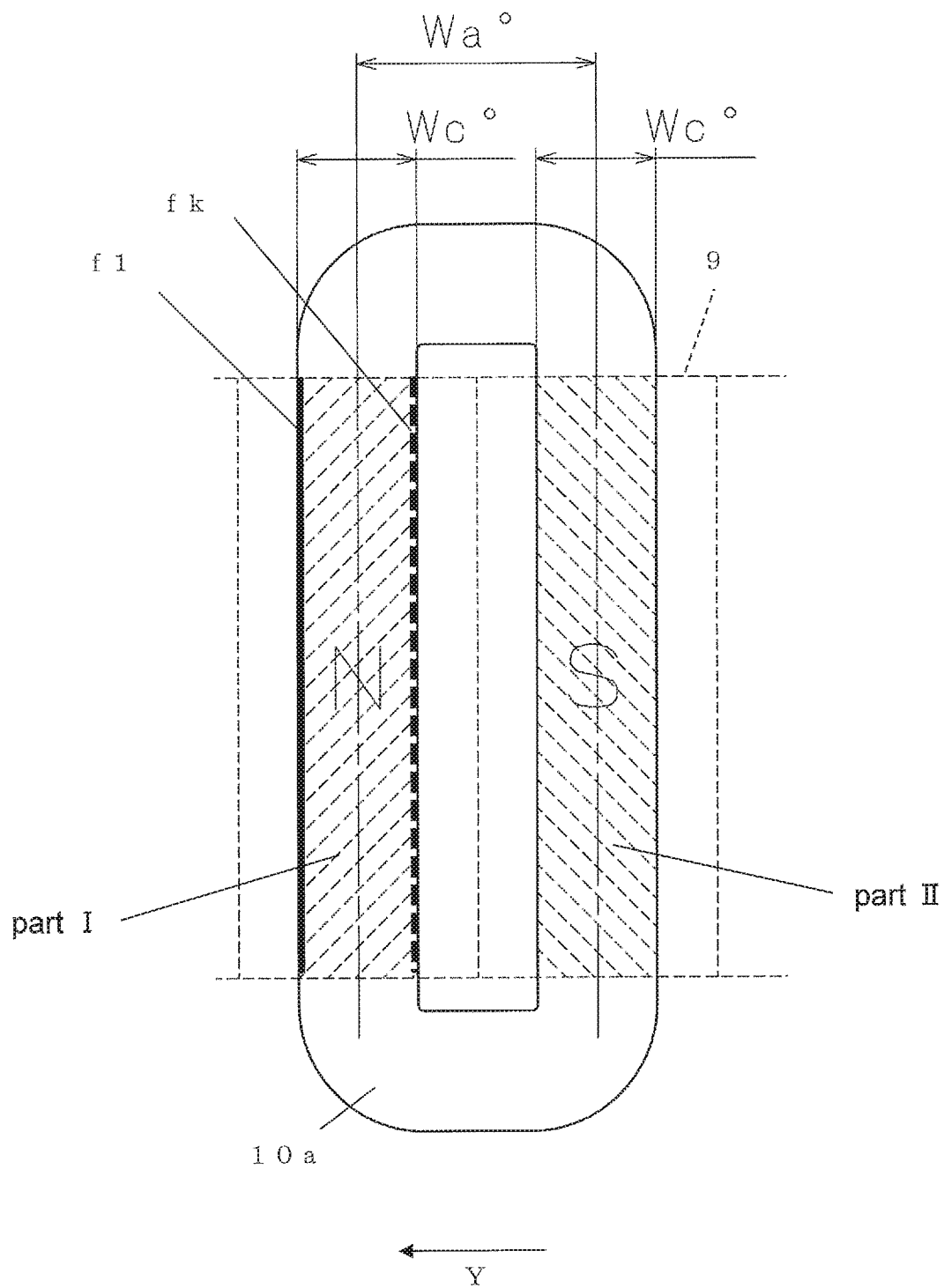
FIG. 5 is a diagram illustrating the relation between the coil and the magnet.

FIG. 5 is a diagram illustrating the relation between the coil 10a and the magnet 9.

In the shape of the coil 10a in FIG. 5, Wc represents the winding width of the coil 10a, and Wa the average width of the coil.

If the magnetic flux density of the magnetic flux generated by the drive magnet 9 changes sinusoidally in the Y direction, the thrust generated in the coils 10a and 10b becomes completely constant when the two phases of thrust are added together.

However, the magnetic flux density of the magnetic flux generated by the drive magnet 9 usually includes harmonic components, such as third, fifth and seventh harmonics.

When the magnetic flux density includes a harmonic component, the thrust generated by the coil 10a generally also includes the harmonic component.

If the thrust includes a harmonic component, the thrust will vary with the position, causing vibration and noise, or lowering the positional accuracy in position control, so it is preferable for the harmonic component to be as small as possible.

FIGS. 6A to 7B are graphs simulating the change in thrust when the coil winding width Wc is varied while the average coil width Wa is fixed at 180° in the magnetic circuit shown in FIG. 5.

The above is the result of calculating the thrust when the coil conductor diameter and the number of turns are varied so that the coil resistance value and the proportional space taken up by the conductor in the coil become constant.

Figure 6A:
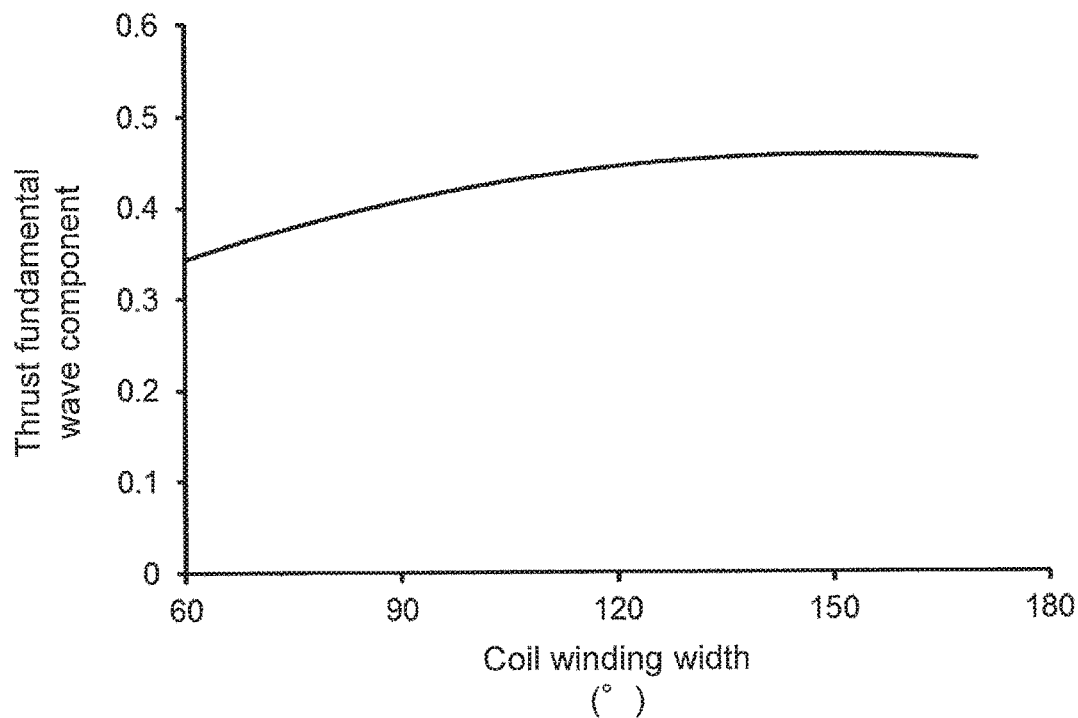
FIG. 6A is a graph simulating the change in thrust when the coil winding width Wc is varied while the average coil width Wa is fixed at $180°$.

As shown in FIG. 6A, the fundamental wave component of the thrust decreases whether the coil winding width Wc is wide or narrow at a peak of 150°.

Figure 6B:
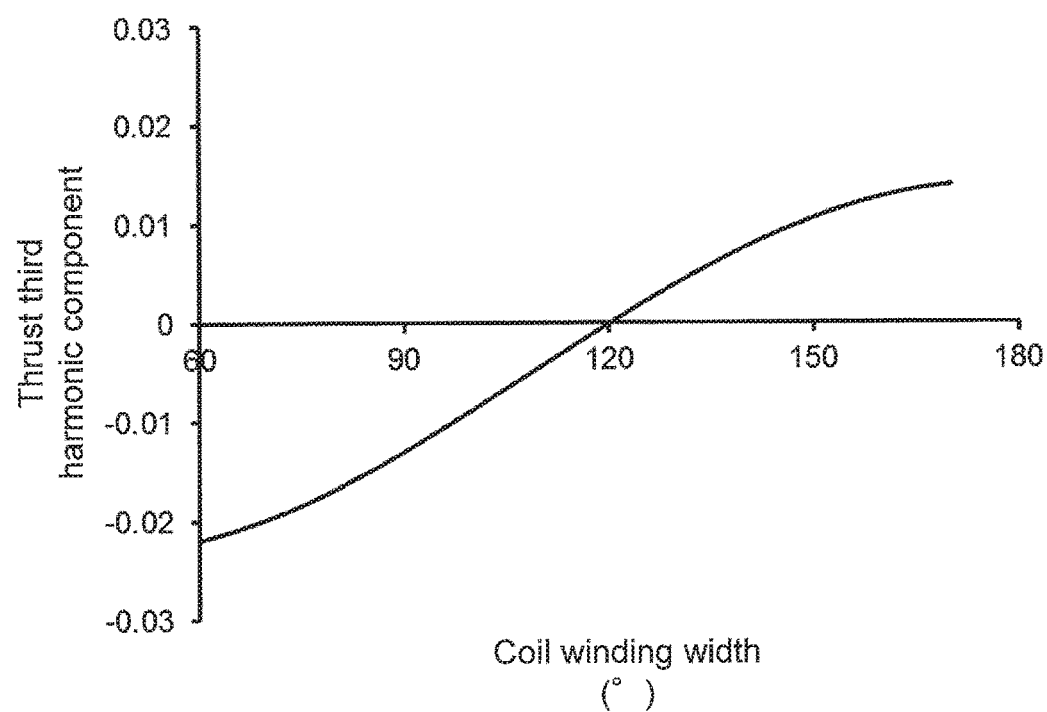
FIG. 6B is a graph simulating the change in thrust when the coil winding width Wc is varied while the average coil width Wa is fixed at $180°$.

Also, as shown in FIG. 6B, the third harmonic component reaches zero at around 120°.

Figure 7A:
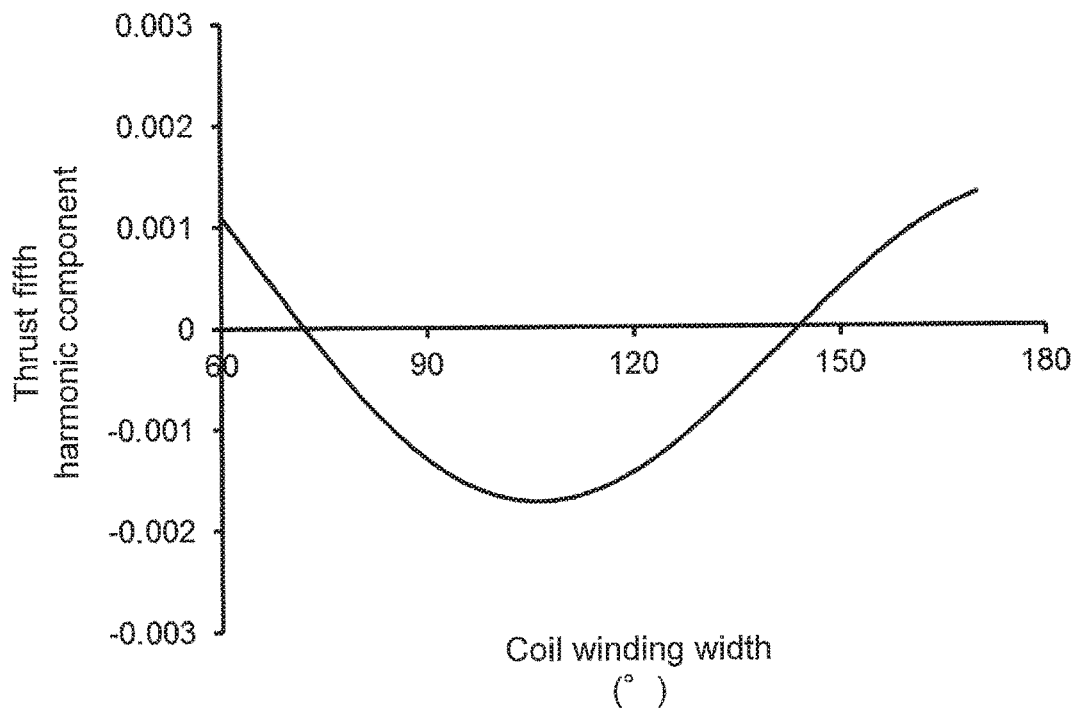
FIG. 7A is a graph simulating the change in thrust when the coil winding width Wc is varied while the average coil width Wa is fixed at $180°$.

Further, as shown in FIG. 7A, the fifth harmonic component reaches zero at around 72° and 144°.

Figure 7B:
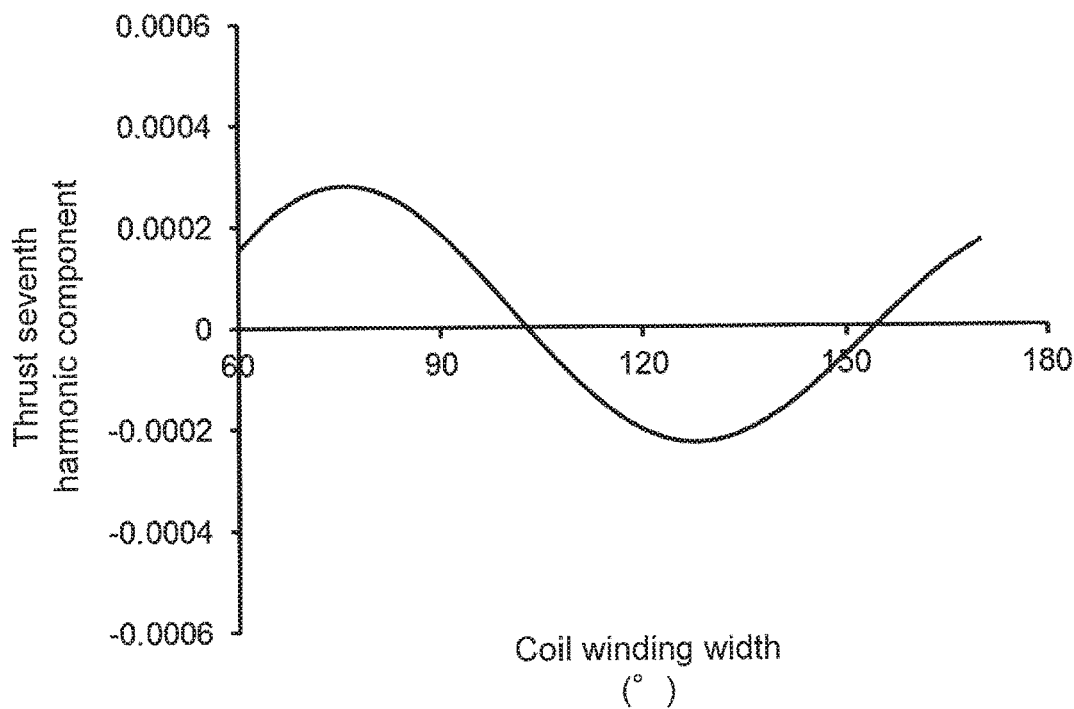
FIG. 7B is a graph simulating the change in thrust when the coil winding width Wc is varied while the average coil width Wa is fixed at $180°$.

Also, as shown in FIG. 7B, the seventh harmonic component reaches zero at around 103° and 154°.

The reason for this will be described in detail with reference to the drawings below.

In FIG. 5, the thrust generated at the I portion of the coil is examined.

In FIG. 5, f1 indicates one turn at the left end of the coil at part I, and fk indicates one turn at the right end of the coil. The total thrust is the sum of the thrusts of f1 to fk, or in other words, the integrated value.

Here, if the winding width Wc of the coil is set to an electrical angle of 120° (corresponds to 360° in the third harmonic), the third harmonic will be integrated for exactly one cycle, and the value will reach zero.

Also, if the winding width Wc is set to an electrical angle of 72° or 144° (corresponds to 360° or 720° in the fifth harmonic), the fifth harmonic will be integrated for exactly one cycle, or for two cycles, and the value will reach zero.

Similarly, zero is reached at:

51.4°, 102.9°, and 154.3° at the seventh harmonic, and
40°, 80°, 120°, and 160° at the ninth harmonic.

The electrical angle at which exactly zero is reached was given above, but if the winding width Wc is set to a value close to the above, a specific harmonic component of the thrust can be reduced.

For example, in the third harmonic, if the winding width Wc of the coil is set so as to satisfy the following relation:

$$112.3° < Wc < 127.7°$$

the third harmonic component can be reduced to one-fifth or less, and a good effect can be obtained.

In general, for the n-th harmonic component, when m is an integer of 1 or more, if the winding width Wc of the coil is designed so as to satisfy the following relation:

$$(M \times 360 - 23.07)/n < Wc < (m \times 360 + 23.07)/n \times 23.07 = a\sin(0.2) \times 2$$

the n-th harmonic component can be reduced to one fifth or less and a good effect can be obtained. Furthermore, if the design satisfies the following relation:

$$(M \times 360 - 11.48)/n < Wc < (m \times 360 + 11.48)/n \times 11.48 = a\sin(0.1) \times 2$$

the n-th harmonic component can be reduced to one-tenth or less, and an even better effect can be obtained.

FIGS. 8A to 9B are graphs simulating the change in thrust when the coil winding width Wc is fixed at 90° and the average coil width Wa is varied.

Figure 8A:
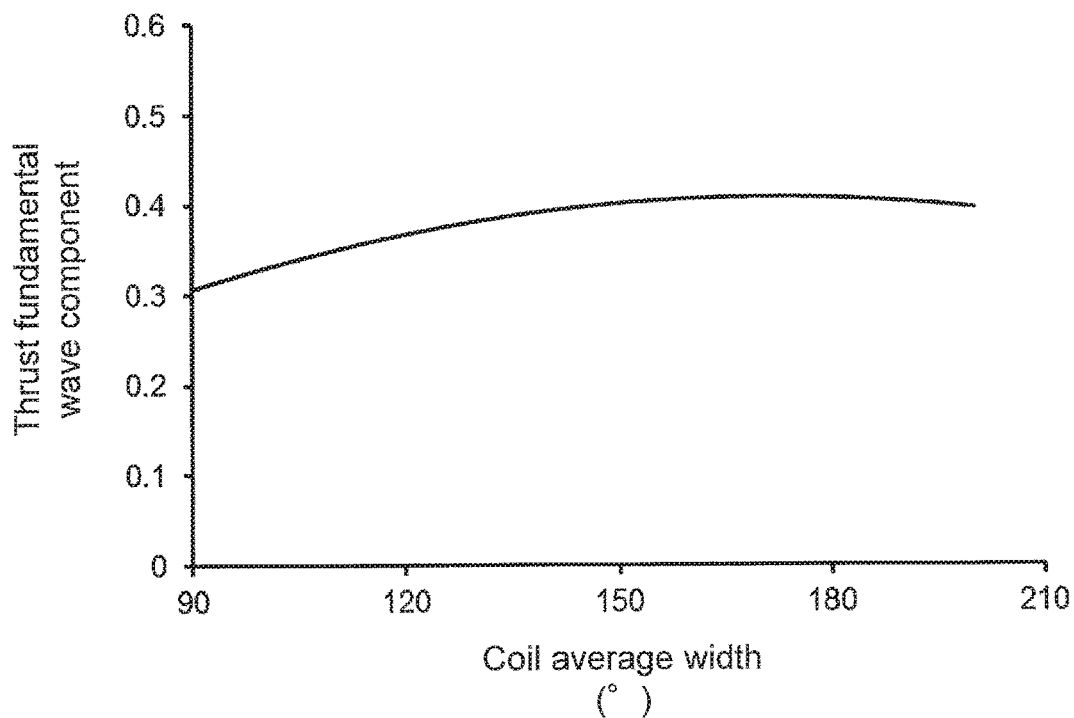
FIG. 8A is a graph simulating the change in thrust when the average coil width Wa is varied while the coil winding width Wc is fixed at $90°$.

As shown in FIG. 8A, the fundamental wave component of the thrust decreases whether the coil winding width Wc is wide or narrow at a peak of 170°.

Figure 8B:
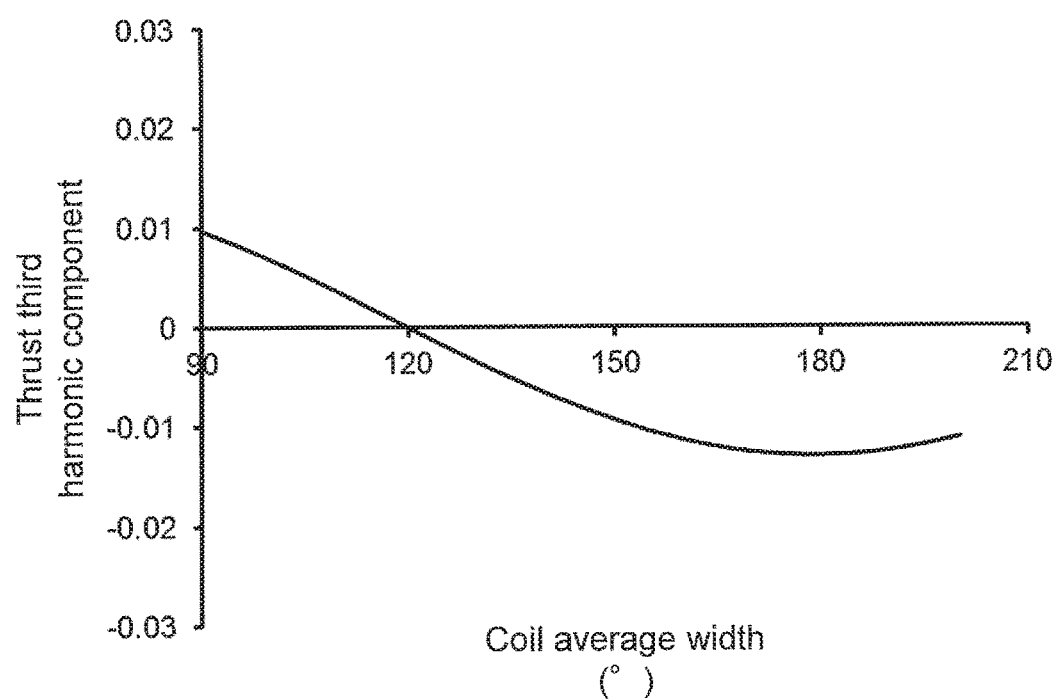
FIG. 8B is a graph simulating the change in thrust when the average coil width Wa is varied while the coil winding width Wc is fixed at $90°$.

Also, as shown in FIG. 8B, with the third harmonic component, zero is reached at around 120°.

Figure 9A:
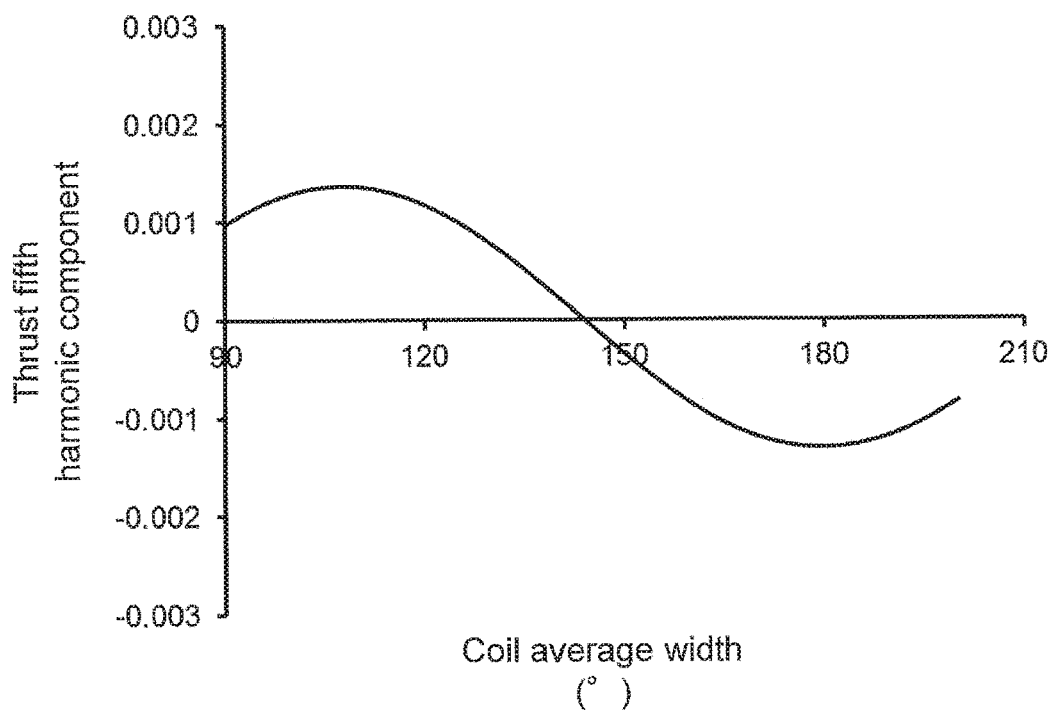
FIG. 9A is a graph simulating the change in thrust when the average coil width Wa is varied while the coil winding width Wc is fixed at $90°$.

Also, as shown in FIG. 9A, with the fifth harmonic component, zero is reached at around 72° and 144°.

Figure 9B:
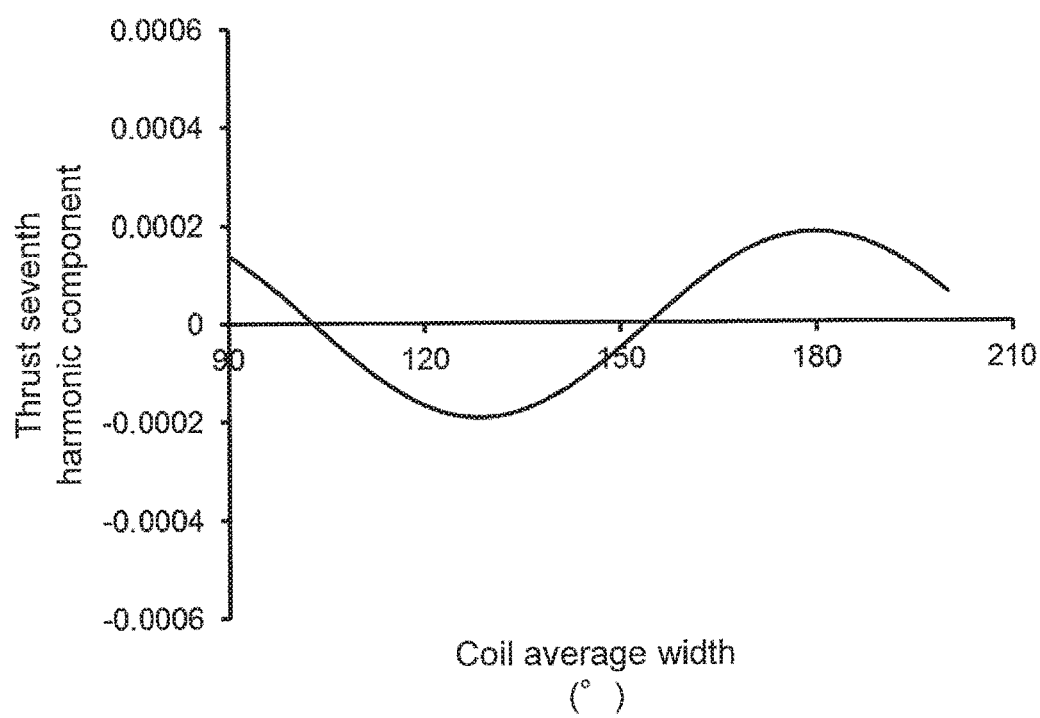
FIG. 9B is a graph simulating the change in thrust when the average coil width Wa is varied while the coil winding width Wc is fixed at $90°$.

Also, as shown in FIG. 9B, with the seventh harmonic component, zero is reached at around 103° and 154°.

The reason for this will now be described in detail with reference to the drawings.

In FIG. 5, the thrust generated in the I part of the coil and the thrust generated in the II part will be examined.

Since the I part and the II part are linked, the direction in which the current flows when the coil is energized is the exact opposite in the I part from that in the II part.

When the average width Wa of the coil is set to 180°, the magnetic flux densities of the I part and the II part are opposite in sign, but are equal in the size of the magnetic flux density. Since the direction of the current is exactly opposite, the thrust generated in the I part and is the same as that in the II part.

On the other hand, when the average width Wa of the coil is shifted from 180°, the thrust generated in the I and II parts is in a state in which thrust is generated in a phase that has been shifted by an amount corresponding to the shift from 180°.

Here, if the average width Wa of the coil is an electrical angle of 120° (corresponds to a 60° shift from 180°, which equals a 180° shift in a third harmonic), thrust is generated in opposite phases in the I part and the II part, so the third harmonic is canceled as a whole and drops to zero.

When the winding width is set to an electrical angle of 72° or 144° (corresponds to a shift of 108° or 36° from 180°, which equals a shift of 540° or 180° for the fifth harmonic), the I part and II part generate thrusts of opposite phase in the fifth harmonic, and they cancel out as a whole, with the value dropping to zero.

Similarly, zero is reached at:

51.4°, 102.9°, and 154.3° at the seventh harmonic, and 40°, 80°, 120°, and 160° at the ninth harmonic.

The electrical angle at which exactly zero is reached was given above, but if the average width Wa is set to a value close to the above, a specific harmonic component of the thrust can be reduced.

For example, in the fifth harmonic, if the average width Wa of the coil is set so as to satisfy the following relation:

$$139.4° < Wa < 148.6°$$

the fifth harmonic component can be reduced to one-fifth or less, and a good effect can be obtained.

In general, for the n-th harmonic component, when m is an integer of 1 or more, if the winding width Wa of the coil is designed so as to satisfy the following relation:

$$(M \times 360 - 23.07)/n < Wa < (m \times 360 + 23.07)/n \times 23.07 = \mathrm{asin}(0.2) \times 2$$

the n-th harmonic component can be reduced to one-fifth or less, and a good effect can be obtained. Furthermore, if the design satisfies the following relation:

$$(M \times 360 - 11.48)/n < Wa < (m \times 360 + 11.48)/n \times 11.48 = \mathrm{asin}(0.2) \times 2$$

the n-th harmonic component can be reduced to one-tenth or less, and an even better effect can be obtained.

In view of this, with the configuration shown in FIG. 4, the third harmonic component is reduced by setting the winding width Wc of the coil to 120°, and the fifth harmonic component is reduced by setting the average width Wa of the coil to 144°.

Figure 10A:
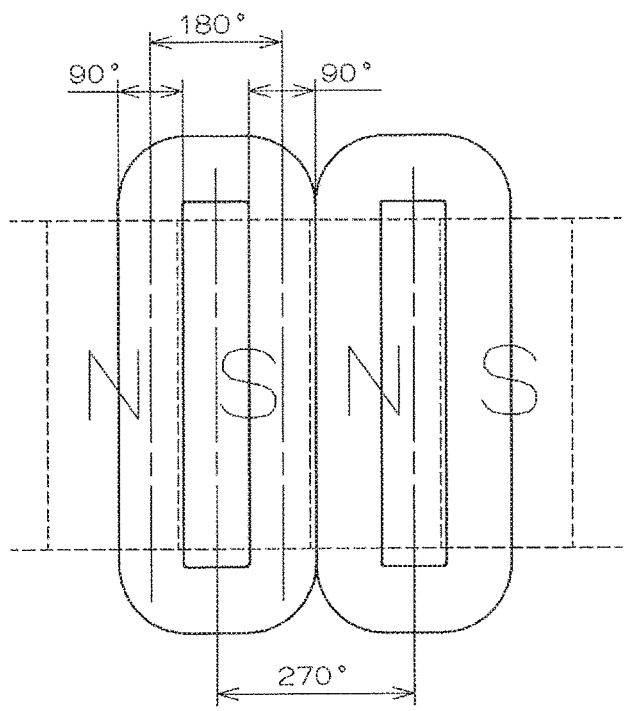
FIG. 10A is a diagram illustrating the relation between the coil and the magnet in a comparative example.
Figure 10B:
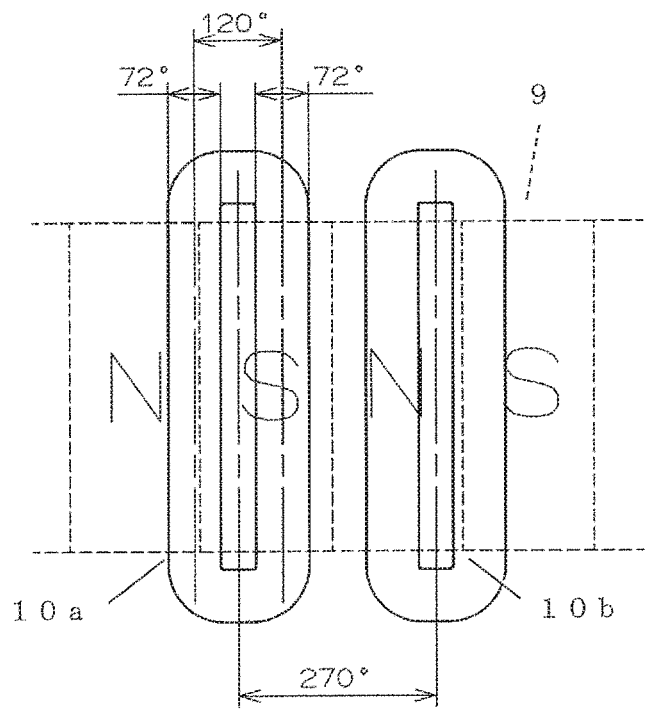
FIG. 10B is a diagram illustrating the relation between the coil and the magnet in another embodiment different from Embodiment 1.

In another possible combination for simultaneously reducing both the third and fifth harmonics with the winding width Wc of the coil and the average width of the coil, the winding width Wc of the coil shown in FIG. 10B is set to 72°, and the average width Wa of the coil is set to 120°.

FIG. 11 is a table comparing the comparative example shown in FIG. 10A with the configuration of the embodiment shown in FIG. 4 and the other configuration shown in FIG. 10B.

With the configuration of the comparative example in FIG. 10A, the average width Wa of the coil is set to 180° and the winding width Wc is set to 90°, which is the maximum value within the range not overlapping the adjacent coil.

In the table, the upper numerical values indicate absolute values, and the lower numerical values indicate the ratio when the fundamental wave component of the comparative example is 100%.

As shown in FIG. 11, with the configuration shown in FIG. 4 and the other configuration shown in FIG. 10B, the third and fifth harmonics almost completely disappear.

As for the fundamental wave component, the configuration shown in FIG. 4 exhibited the highest value, at 106.46%. This indicates that the configuration in Embodiment 1 does not generate harmful harmonic components of the thrust, even though the thrust is high.

The reason for this seems to be that whereas the coil shape in the comparative example shown in FIG. 5 has a large cavity right in the middle of the coil, the coil shape in Embodiment 1 shown in FIG. 4 has almost no unnecessary cavity, and the space is large enough for the coil to be wound, so the cross sectional area of the coil can be larger and the number of turns of the coil can be increased.

As described above, in Embodiment 1 the thrust density of the linear motor can be increased, the linear motor can be made more compact. Also, a linear motor with little fluctuation in thrust and little generation of vibration and noise can be provided by reducing the harmonic component of the thrust.

Furthermore, by fine-tuning the configuration of the coil and the field magnet component, it is possible to provide a linear motor and an imaging device with which the harmonic component of the thrust, which is a problem in multiphase drive, can be reduced, and positioning with high accuracy can be accomplished.

Figure 17:
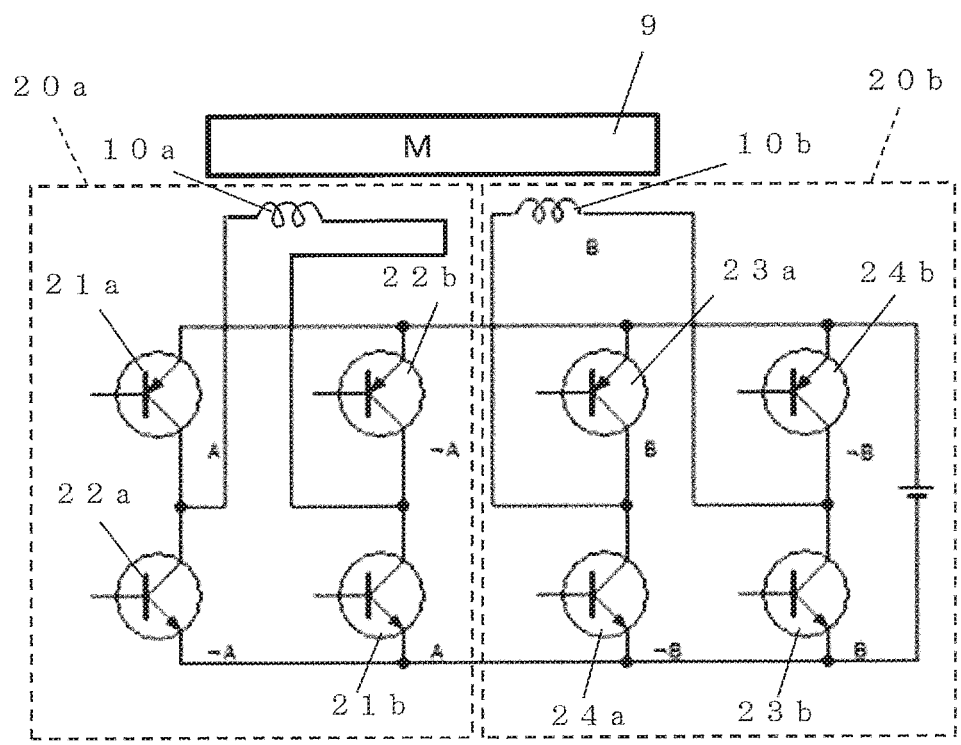
FIG. 17 is a diagram of the drive circuit of a two-phase linear motor.

The linear motor of this embodiment can also be shown by the drive circuit in FIG. 17.

More specifically, as shown in FIG. 17, in a two-phase drive type of drive circuit, the linear motor comprises a circuit 20a that drives the coil 10a on the A-phase side, a circuit 20b that drives the coil 10b on the B-phase side, and the drive magnet 9 that is disposed at a position close to the coils 10a and 10b.

The circuit 20a on the A-phase side has transistors 21a and 21b on the positive side and transistors 22a and 22b on the negative side.

The circuit 20b on the B-phase side has transistors 23a and 23b on the positive side and transistors 24a and 24b on the negative side.

Consequently, in the circuit 20a on the A-phase side and the circuit 20b on the B-phase side, the lens frame 3 can be driven back and forth in the optical axis direction with respect to the drive magnet 9 by alternately turning the positive and negative sides on and off.

Figure 18A:
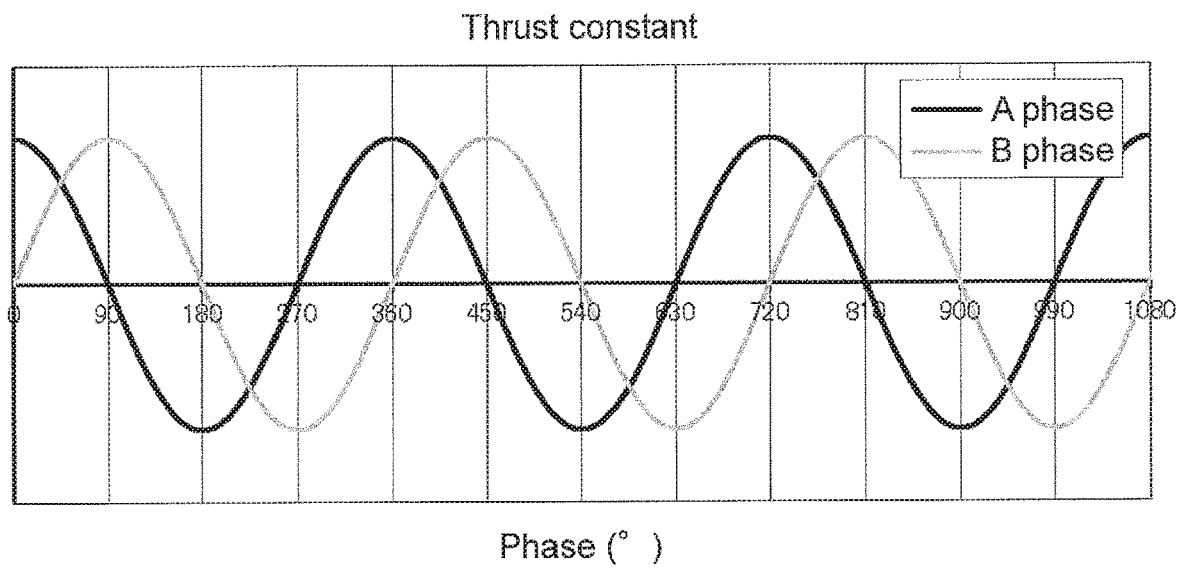
FIG. 18A is a graph of the relation between thrust constant and phase.

Also, in the circuit 20a on the A-phase side and the circuit 20b on the B-phase side, the thrust constant with respect to the phase is a plot of a sine wave, as shown in FIG. 18A.

Figure 18B:
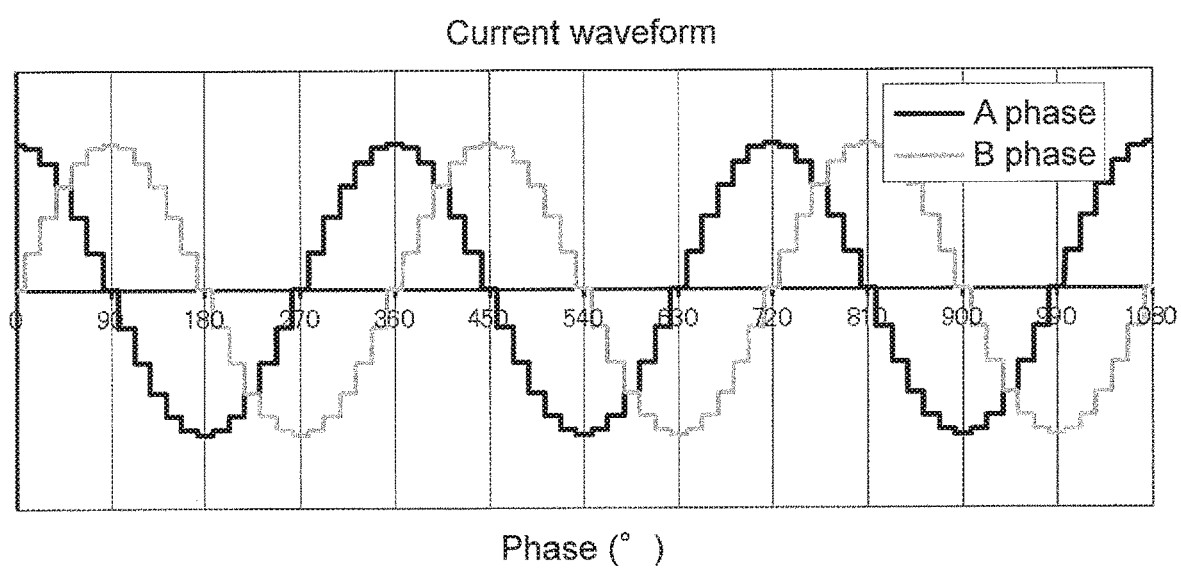
FIG. 18B is a graph of the relation between current waveform and phase.
Figure 18C:
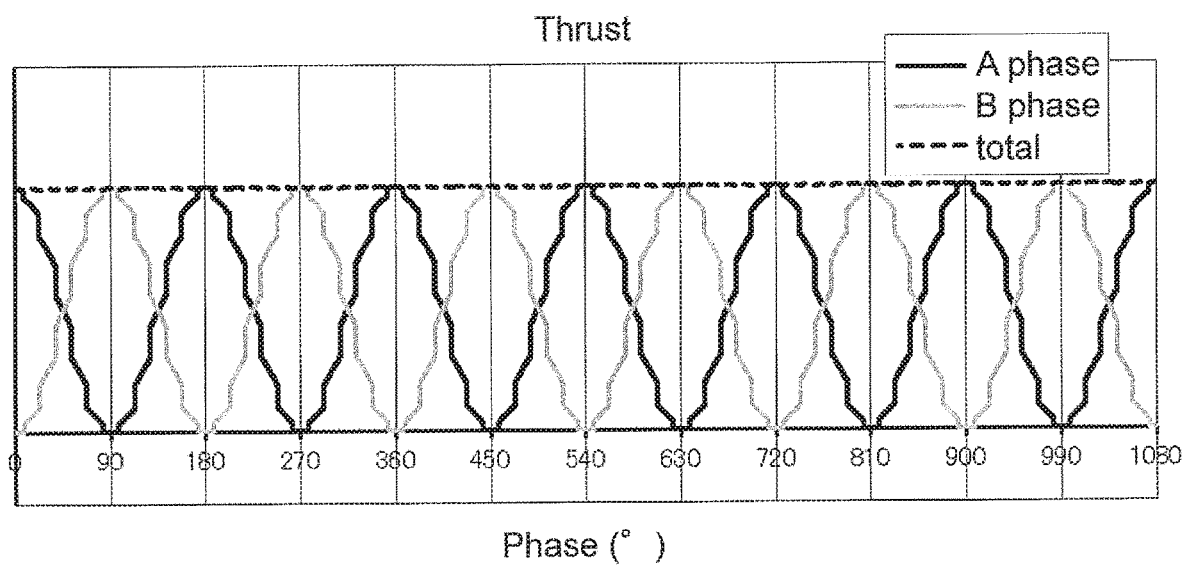
FIG. 18C is a graph of the relation between thrust and phase when the graph of FIG. 18A and the graph of FIG. 18B are superimposed.
Figure 19:
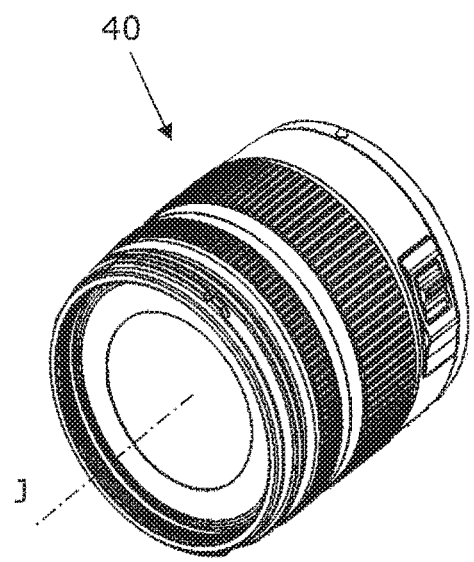
FIG. 19 is an oblique view of the configuration of a lens barrel in which the focusing unit in FIG. 1 has been mounted.
Figure 20:
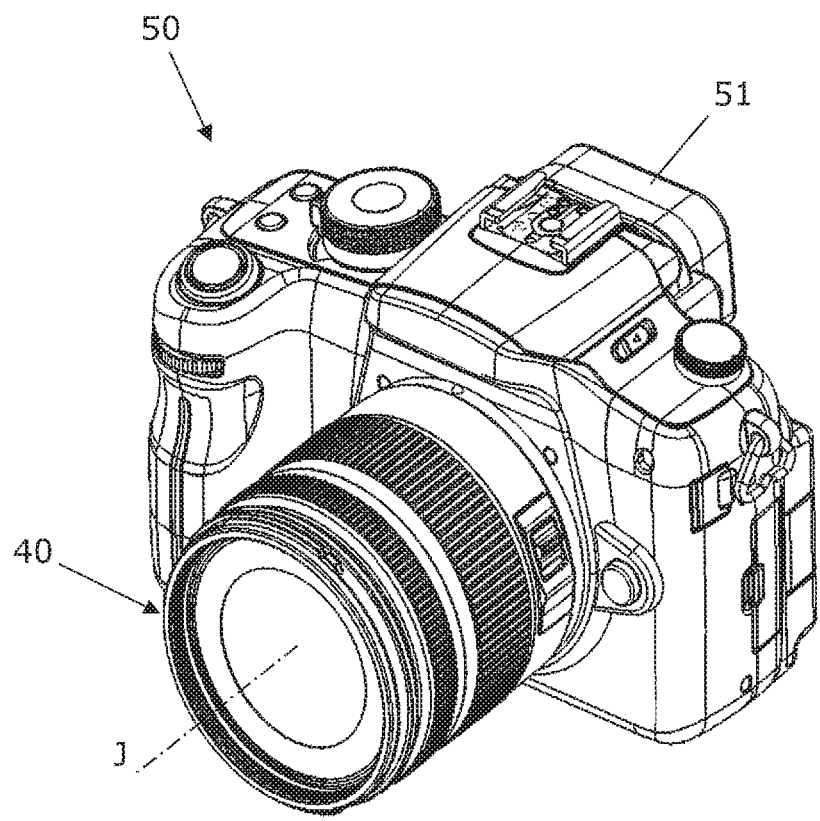
FIG. 20 is an oblique view of the configuration of a camera in which the lens barrel in FIG. 19 has been mounted.

According to the phase, a current is supplied in which the current waveform is a sine wave, as shown in FIG. 18B.

As a result, the thrust generated in each of the A phase and the B phase is the thrust indicated by the solid line in FIG.

18C, and a substantially constant thrust can be obtained for the linear motor as a whole, as shown by the dotted line.

A two-phase drive method using two coils is shown in Embodiment 1, but a three-phase drive method using three coils is also possible.

However, in the case of three-phase drive, it is necessary to use three coils aligned in the optical axis direction, and the actuator tends to be longer in the optical axis direction than with two-phase drive, so two-phase drive is preferable for the purposes of driving a lens.

Embodiment 2

In Embodiment 1, a method for improving performance by modifying the shape of a coil was described, but in Embodiment 2 an example is given in which the performance is further improved by modifying the configuration of the field magnet component including the magnet.

The configuration of the field magnet component according to Embodiment 2 will be described with reference to FIGS. 12 to 14.

In Embodiment 1, the single magnet 9 is configured by multipolar magnetization, but in Embodiment 2, the magnet 9 is divided up for each magnetic pole.

Figure 12A:
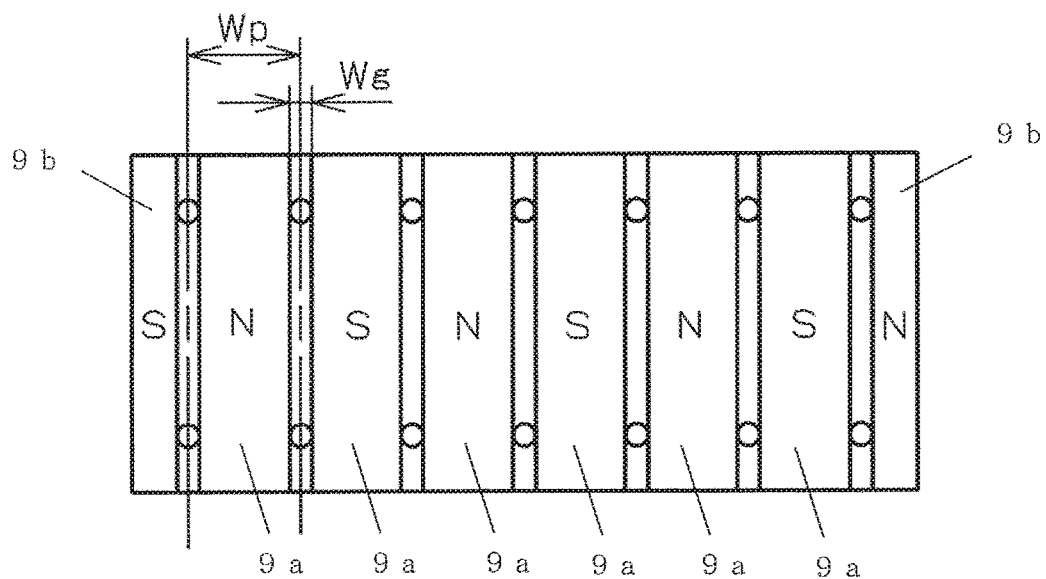
FIG. 12A is a front view of the field magnet component in Embodiment 2.
Figure 12B:
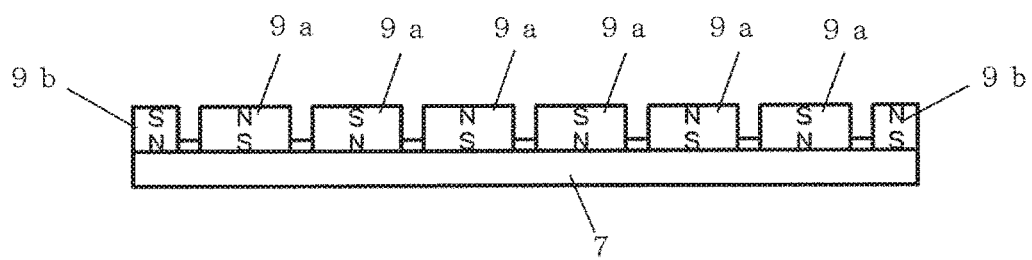
FIG. 12B is a side view of the field magnet component in Embodiment 2.

FIG. 12 is a front view and a side view of the field magnet component according to Embodiment 2.

In FIG. 12, the field magnet component is constituted by the main yoke 7, six large magnets 9a, and two small magnets 9b that are each half as wide as the large magnets.

The large magnets 9a are disposed on the main yoke 7 such that the directions of the magnetic poles alternate between north and south. The magnetic pole pitch in the multipolar direction is set to Wp, but the width of the large magnets 9a is narrower than the magnetic pole pitch by Wg. Also, the small magnets 9b are disposed at both ends, at an interval of Wg.

In general, in the case of multipolarizing a single magnet, it is difficult to fully magnetize the switching portion of the magnetic pole, but by arranging magnets that have been fully magnetized with a single pole in advance, the performance of the magnet can be improved, and it is often possible to extract more of the magnetic flux than when using a single magnet.

Figure 13:
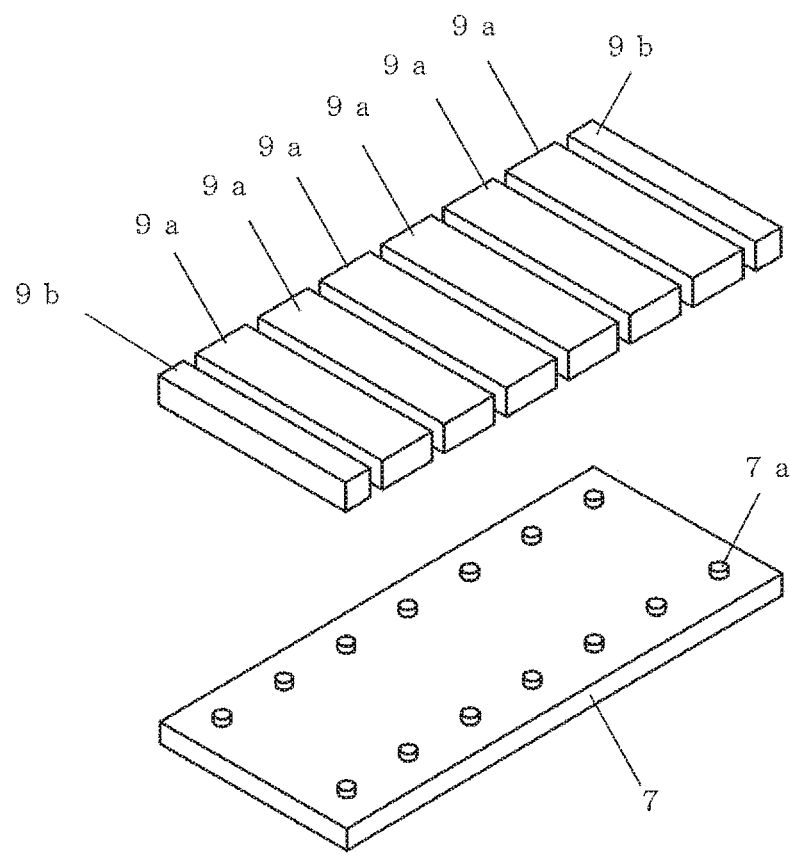
FIG. 13 is an exploded oblique view of the field magnet component in Embodiment 2.

FIG. 13 is an exploded oblique view of the field magnet component according to Embodiment 2.

In FIG. 13, a plurality of protrusions 7a are formed on the main yoke 7 by stamping.

During assembly, the large magnets 9a can be properly disposed by inserting the large magnets 9a between the protrusions 7a.

Figure 14:
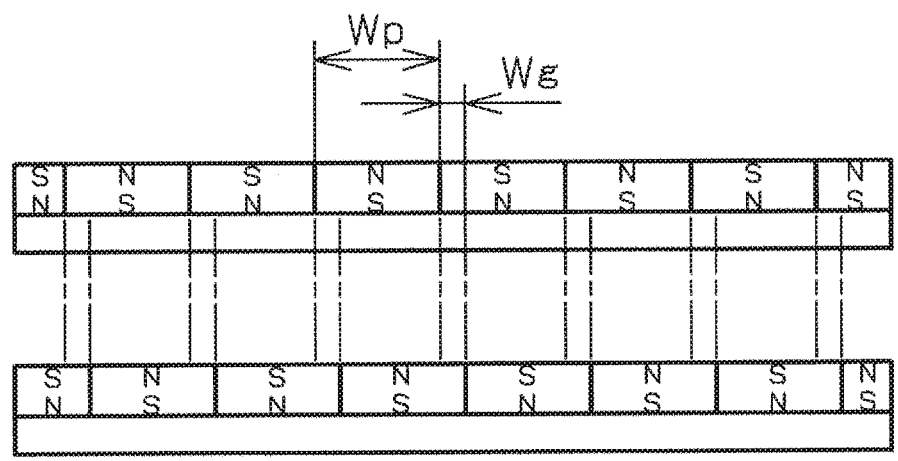
FIG. 14 is a diagram illustrating the principle of harmonic reduction in the field magnet component according to the Embodiment 2.

FIG. 14 is a drawing illustrating the principle of harmonic reduction in the field magnet component according to Embodiment 2.

It is known that, in the configuration of a magnetic circuit, calculation is possible by superposition in a region where magnetic saturation does not occur.

With the configuration of the field magnet component in Embodiment 2, multipolar magnetization is performed at the same magnetic pole pitch Wp as that of the field magnet component A that has undergone multipolar magnetization at the magnetic pole pitch Wp in FIG. 14, and it can be understood that this is equivalent to the superposition of the field magnet component B whose phase has been shifted by Wg.

The magnetic flux density generated by the field magnet component A and the magnetic flux density generated by the field magnet component B have the same waveform and amplitude, but their phases are different from each other by Wg. Here, for example, if Wg is set to an electrical angle of 36°, the phases of the magnetic flux density of the field magnet component A and the field magnet component B will differ by 36° (corresponds to 180° in the fifth harmonic), and the fifth harmonic will be canceled out overall.

Similarly, in general, if we let Wg be the adjacent magnet gap, k be the order of the harmonic component to be reduced, and j an arbitrary integer, the k-th harmonic component can be completely canceled out if the design satisfies the following relationship.

$$Wg = 180 \times (1+2j)/k$$

The electrical angle at which exactly zero is reached was given above, but if Wg is set to a value close to the above, a specific harmonic component of the thrust can be reduced.

In general, if we let Wg be the adjacent magnet gap, k be the order of the harmonic component to be reduced, and j an arbitrary integer, the k-th harmonic component can be reduced to one-fifth or less and a good effect can be obtained if the design satisfies the following relationship.

$$\{180 \times (1+2j) - 23.07\}/k < Wg < \{180 \times (1+2j) + 23.07\}/k \times 23.07 = \mathrm{asin}(0.2) \times 2$$

Furthermore, if we let Wg be the adjacent magnet gap, k be the order of the harmonic component to be reduced, and j an arbitrary integer, the k-th harmonic component can be reduced to one-tenth or less and an even better effect can be obtained if the design satisfies the following relationship.

$$\{180 \times (1+2j) - 11.48\}/k < Wg < \{180 \times (1+2j) + 11.48\}/k \times 11.48 = \mathrm{asin}(0.2) \times 2$$

It should go without saying that reducing the harmonic component of the magnetic flux will also reduce the harmonic component of the thrust.

Embodiment 2 shows a method for reducing the harmonic component of thrust by modifying the configuration of the field magnet component, but performance can be further improved by combining the coil shape shown in Embodiment 1.

For instance, as described in Embodiment 1, after the third and fifth harmonic components have been reduced by the coil shape, the seventh harmonic component of the magnetic flux can be canceled out by setting Wg to 25.7°. Thus, the seventh harmonic of thrust, which could not be reduced by the coil shape alone, can also be reduced.

Alternatively, although it is theoretically possible to completely cancel out the third harmonic with the coil shape or the configuration of the field magnet component, in actual manufacturing there is dimensional variation in the coil dimensions, magnet dimensions, and so on, so it is impossible to cancel this out completely. In view of this, once the coil shape is used to reduce the third and fifth harmonic components, the third harmonic component of the magnetic flux can be canceled out by setting Wg to 60°. Thus, by cutting down the third harmonic of the thrust by a two-pronged approach combining the coil shape and the configuration of the field magnet component, it is possible to effectively reduce the third harmonic component, which starts out having a large value, and even if there is dimensional variance, it will be possible to stably reduce the harmonic component of the thrust.

Embodiment 3

Embodiments 1 and 2 described a method for reducing the harmonic component of thrust by modifying the shape of the coil and the configuration of the field magnet component, but in Embodiment 3 an example is given in which performance is further improved.

Figure 15A:
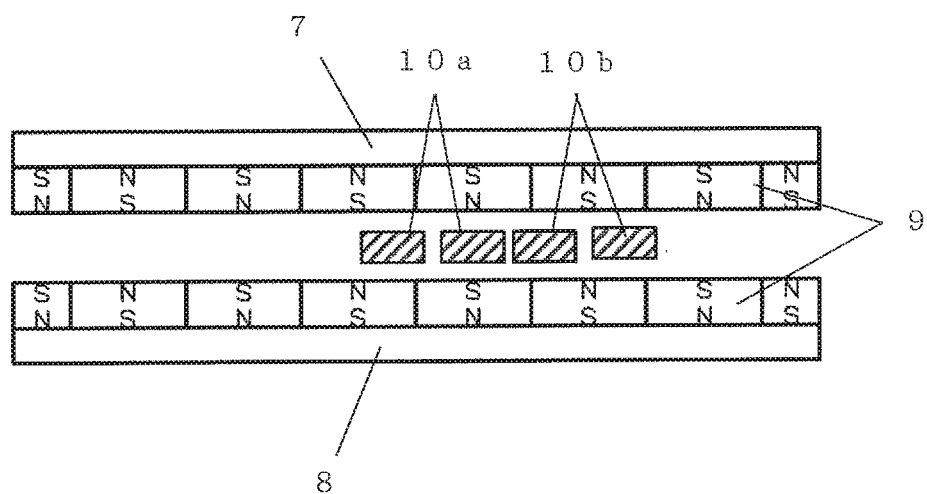
FIG. 15A is a side view of the configuration of the field magnet component in Embodiment 3.
Figure 15B:
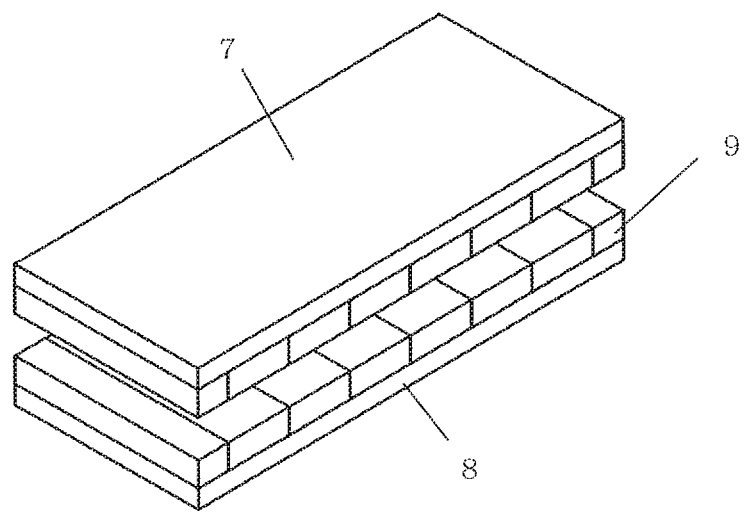
FIG. 15B is an oblique view of the configuration of the field magnet component in Embodiment 3.

FIGS. 15A and 15B are a side view and an oblique view of the configuration of the field magnet component according to Embodiment 3.

In Embodiment 1, a configuration was shown in which the magnets 9 were disposed only on the outer peripheral side of the coils 10a and 10b, but in Embodiment 3 the configuration is such that the magnets 9 are disposed on both the inner peripheral side and the outer peripheral side of the coils.

The advantages of disposing the magnets 9 on both sides of the coils will now be described.

Figure 16A:
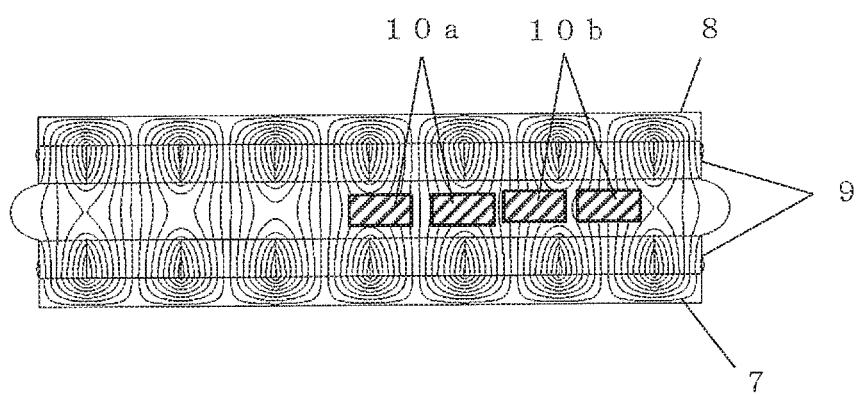
FIG. 16A is a magnetic field line diagram of the field magnet component in Embodiment 3.
Figure 16B:
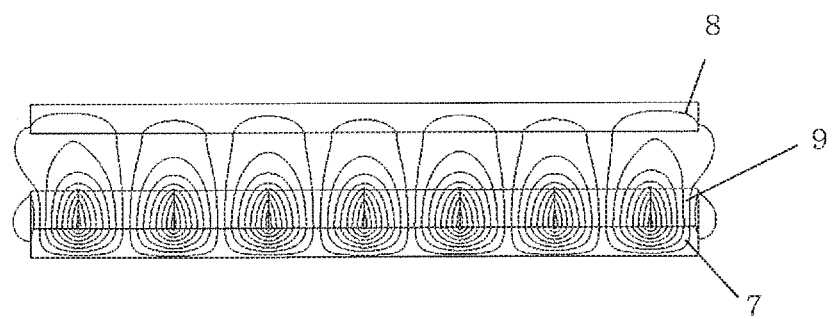
FIG. 16B is a magnetic field line diagram of the field magnet component in a comparative example.

FIG. 16A is a magnetic field diagram of the field magnet component in Embodiment 3, and FIG. 16B is a magnetic field diagram of the field magnet component in a comparative example.

FIG. 16B shows the lines of magnetic force in a state in which the magnets 9 are disposed only on one side of the coil, as in Embodiment 1.

As shown in FIG. 16B, it can be seen that the magnetic flux of the coil portions is directed obliquely.

It can be seen that this generates thrust not only in the direction of the optical axis, as required for the coil to drive the lens, but also in the perpendicular direction. As a result of magnetic field analysis of this comparative example, the thrust in the perpendicular direction was approximately 35% of the thrust in the optical axis direction at maximum.

The thrust in the perpendicular direction is preferably as small as possible, since it causes vibration, noise, and the like in the lens frame.

FIG. 16A is a magnetic field line diagram in a state in which the magnets 9 are disposed on both sides of the coils.

As shown in FIG. 16A, it can be seen that the magnetic flux density of the coil portions is corrected to be fairly straight, as compared to FIG. 16B. As a result of magnetic field analysis of this embodiment, it was found that no thrust was generated in the perpendicular direction.

Thus disposing the magnets 9 on both sides of the coil makes it less likely that vibration, noise, and the like will be generated in the lens frame.

Also, a comparison of FIGS. 16A and 16B reveals that the density of the magnetic lines of force of the coil portions is high. Saying that the density of the magnetic lines of force (that is, the magnetic flux density) is high indicates that the thrust is high. As a result of the magnetic field analysis in this example, it was confirmed that disposing the magnets 9 on both sides of the coil increases the thrust by approximately 1.5 times.

Disposing the magnets 9 on both sides of the coil as in this embodiment suppresses the generation of thrust in the perpendicular direction, which is a cause of vibration, noise, and the like, and at the same time makes it possible to significantly increase the thrust.

In addition, although Embodiment 3 only illustrated disposing the magnets 9 on both sides of the coil, it should also go without saying that the technology of Embodiment 1 and Embodiment 2 can be used in combination.

Embodiments 1 to 3 were described above as examples of the technology disclosed herein, and the appended drawings and the Detailed Description are provided for that purpose.

Therefore, the constituent elements shown in the appended drawings and described in the Detailed Description include not only those constituent elements that are essential for solving the problem, but also components that are not essential for solving the problem and are used in order to given an example of the above-mentioned technology. Therefore, the fact that these non-essential components are shown in the appended drawings and described in the Detailed Description should not be interpreted to mean that those non-essential constituent elements are essential.

In addition, since the above embodiments are intended to illustrate the technology disclosed herein, various modifications, substitutions, additions, omissions, and so forth are possible within the scope of the claims or equivalents thereof.

INDUSTRIAL APPLICABILITY

Since the linear motor disclosed herein has the effect of increasing thrust and lengthening the stroke, this linear motor can be broadly applied to a variety of devices such as imaging devices that move a lens frame in the optical axis direction to capture an image of the subject.

REFERENCE SIGNS LIST 1 focusing unit (linear motor)
2 holding frame
3 lens frame
4 main guide pole
5 auxiliary guide pole
6 guide cover
7 main yoke
8 auxiliary yoke
9 drive magnet (magnet)
9a large magnet
9b small magnet
10a, 10b coil
11 flexible substrate
12 MR element (position detection sensor)
13 MR magnet (position detection member)
20a, 20b circuit
21a, 21b transistor
22a, 22b transistor
23a, 23b transistor
24a, 24b transistor
31 pole insertion hole
40 lens barrel
50 camera (imaging device)
51 camera body (main body unit)

The invention claimed is:

1. A linear motor driven in two phases, the linear motor comprising:
   a two-phase coil; and
   a magnet disposed along a drive direction at a position opposite the two-phase coil;
   a winding width of the coil at a portion opposite the magnet is within an electrical angle range of 120°±7.7°,
   an average width of the coil at the portion opposite the magnet is within an electrical angle range of 144°±4.6°, and
   a pitch between the two-phase of coils is an electrical angle of 90°+180°×(n is an integer of 0 or more).

2. The linear motor according to claim 1,
   further comprising a field magnet component in which the north and south poles of a plurality of single-pole magnetized magnets are arranged alternately,
   wherein, if we let Wg be the gap between adjacent magnets, k be the harmonic order to be reduced, and j be an arbitrary integer, the following relation is satisfied $$\{180°×(1+2j)-23.07°\}/k < Wg < \{180°×(1+2j)+23.07°\}/k.$$

3. The linear motor according to claim 1, further comprising a field magnet component in which the magnets are disposed on both sides of the coil so as to sandwich the coil.

4. A lens barrel, comprising:

a lens frame configured to move back and forth in the optical axis direction;

a two-phase coil that is fixed to the lens frame, has a winding axis in a direction substantially perpendicular to the optical axis, and is aligned along the optical axis direction; and magnets that are disposed along the optical axis direction at positions opposite both sides of the two-phase coil so as to sandwich the two-phase coil.

5. The lens barrel according to claim 4, wherein a winding width of the coil at a portion opposite the magnet is within an electrical angle range of $120°±7.7°$, an average width of the coil at the portion opposite the magnet is within an electrical angle range of $144°±4.6°$, and a pitch between the two-phase of coils is an electrical angle of $90°+180°×n$ (n is an integer of 0 or more).

6. The lens barrel according to claim 4, further comprising a field magnet component in which the north and south poles of a plurality of single-pole magnetized magnets are alternately arranged, wherein, if we let Wg be the gap between adjacent magnets, k be the harmonic order to be reduced, and j be an arbitrary integer, the following relation is satisfied $$\{180°×(1+2j)−23.07°\}/k < Wg < \{180°×(1+2j)+23.07°\}/k.$$

7. An imaging device, comprising:

the lens barrel according to claim 4; and a main body unit to which the lens barrel is attached.

* * * * *